United States Patent
Milheim (10) Patent No.: US 12,368,356 B1
(45) Date of Patent: Jul. 22, 2025

(54) HOUSING FOR AXIAL FLUX MOTOR ASSEMBLIES

(71) Applicant: E-Circuit Motors, Inc., Needham Heights, MA (US)

(72) Inventor: George Harder Milheim, Bozeman, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/036,887

(22) Filed: Jan. 24, 2025

Related U.S. Application Data (60) Provisional application No. 63/710,099, filed on Oct. 22, 2024.

(51) Int. Cl.
| | |
|---|---|
| *H02K 15/165* | (2025.01) |
| *H02K 1/2798* | (2022.01) |
| *H02K 3/26* | (2006.01) |
| *H02K 7/08* | (2006.01) |
| *H02K 21/24* | (2006.01) |

(52) U.S. Cl.
CPC ......... *H02K 15/165* (2013.01); *H02K 1/2798* (2022.01); *H02K 3/26* (2013.01); *H02K 7/083* (2013.01); *H02K 21/24* (2013.01); *H02K 2203/03* (2013.01)

(58) Field of Classification Search
CPC ...... H02K 15/165; H02K 1/2798; H02K 3/26; H02K 7/083; H02K 21/24; H02K 2203/03
See application file for complete search history.

(56) References Cited

U.S. PATENT DOCUMENTS

| | | |
|---|---|---|
| 7,109,625 B1 | 9/2006 | Jore et al. |
| 8,823,241 B2 * | 9/2014 | Jore ........................ H02K 21/24 |
| | | 310/179 |
| 9,673,688 B2 | 6/2017 | Shaw |
| 9,800,109 B2 | 10/2017 | Shaw |
| 9,899,886 B2 * | 2/2018 | Sullivan ................ H02K 1/278 |
| 10,170,953 B2 | 1/2019 | Shaw |
| 10,211,694 B1 | 2/2019 | Shaw |
| 10,608,490 B2 | 3/2020 | Woolmer et al. |
| 10,826,338 B2 | 11/2020 | Woolmer et al. |
| 11,005,322 B2 | 5/2021 | Milheim et al. |
| 11,121,614 B2 | 9/2021 | Milheim |
| 11,183,896 B2 * | 11/2021 | Guedes-Pinto ......... H02K 9/06 |
| 11,336,130 B1 | 5/2022 | Shaw et al. |
| 11,527,933 B2 | 12/2022 | Shaw et al. |
| 11,626,779 B2 | 4/2023 | Shaw et al. |
| 11,751,330 B2 | 9/2023 | Milheim et al. |

(Continued)

FOREIGN PATENT DOCUMENTS

| | | |
|---|---|---|
| CN | 216451192 U | 5/2022 |
| EP | 4283839 A1 | 11/2023 |

(Continued)

*Primary Examiner* — Jeffrey T Carley
*Assistant Examiner* — Jose K Abraham
(74) *Attorney, Agent, or Firm* — Pierce Atwood LLP (57) ABSTRACT

A disclosed apparatus includes a housing for an assembly of an axial flux machine, the assembly including at least a stator, a rotor, and bearings attached to the rotor. The housing is configured to support and locate the bearings and the stator within pockets that are open on one side to allow the assembly to be inserted into the housing in a direction perpendicular to a rotational axis of the rotor.

25 Claims, 10 Drawing Sheets

(56) References Cited

U.S. PATENT DOCUMENTS

| | | | |
|---|---|---|---|
| 11,799,342 B2 | 10/2023 | Frampton et al. | |
| 11,855,484 B2 | 12/2023 | Milheim et al. | |
| 11,936,253 B1 | 3/2024 | Guedes-Pinto et al. | |
| 2005/0116563 A1* | 6/2005 | Matsubara | H02K 15/02 29/596 |
| 2006/0202584 A1* | 9/2006 | Jore | H02K 11/215 310/179 |
| 2010/0164316 A1* | 7/2010 | Langford | H02K 1/2795 29/598 |
| 2018/0323689 A1* | 11/2018 | Schuler | H02K 1/2798 |
| 2021/0083537 A1* | 3/2021 | Milheim | H02K 1/2798 |

FOREIGN PATENT DOCUMENTS

| | | | |
|---|---|---|---|
| TW | 201448418 A | * 12/2014 | |
| WO | WO-9531031 A2 | * 11/1995 | H02K 15/028 |

\* cited by examiner

HOUSING FOR AXIAL FLUX MOTOR ASSEMBLIES

CROSS-REFERENCE TO RELATED APPLICATIONS

This application claims the benefit under 35 U.S.C. § 119(e) of U.S. Provisional Application Ser. No. 63/710,099 entitled BALANCING ASSEMBLY FOR DUAL ROTOR AXIAL FLUX PCB STATOR MOTORS, filed Oct. 22, 2024, the entire contents of which are incorporated herein by reference for all purposes.

BACKGROUND

Axial flux motors and generators described by several patents, including U.S. Pat. Nos. 7,109,625; 9,673,688; 9,800,109; 10,170,953; 10,211,694; 11,005,322; 11,121,614; 11,336,130; 11,527,933; 11,626,779; 11,751,330, the entire contents of which are incorporated herein by reference, feature a generally planar printed circuit board stator assembly interposed between magnets magnetized with alternating north-south poles. The magnets are affixed to a shaft via "back-irons" for connection to the mechanical load (or source for a generator). The back irons also serve as flux return paths for the magnets, providing a high permeability connection between adjacent poles.

DETAILED DESCRIPTION

Figure 1:
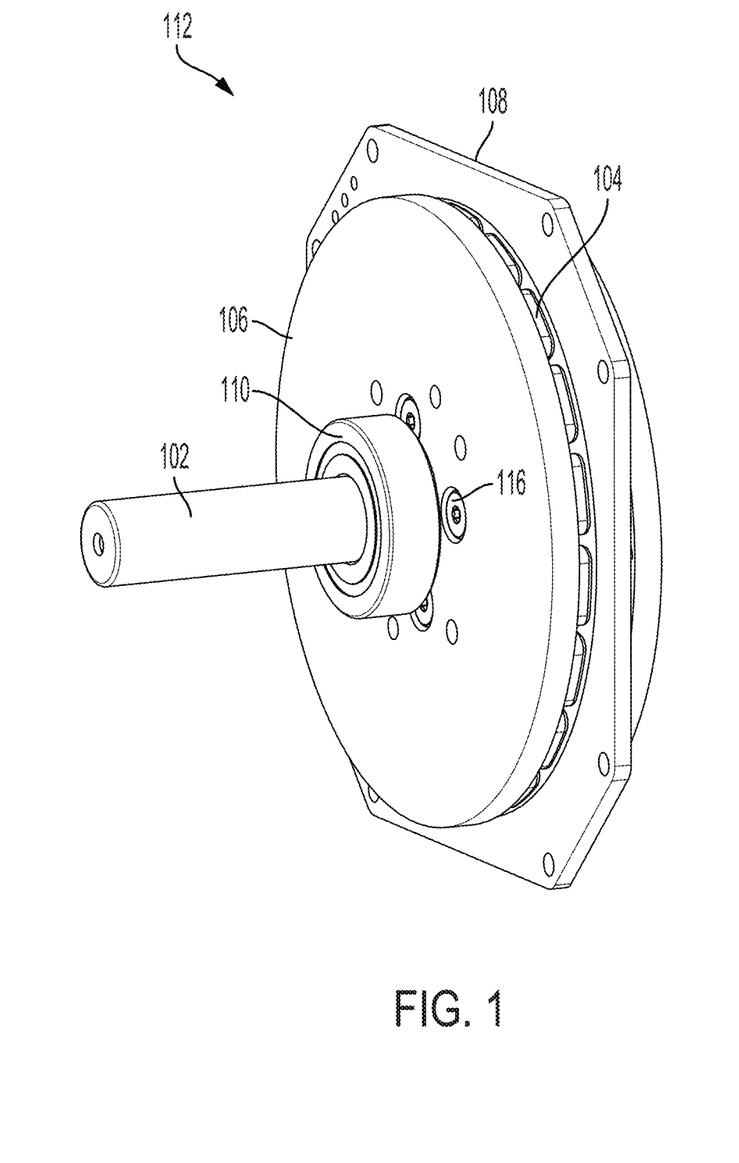
FIG. 1 shows an example of a frameless motor assembly that may be disposed in a housing configured in accordance with some embodiments of the present disclosure.
Figure 2:
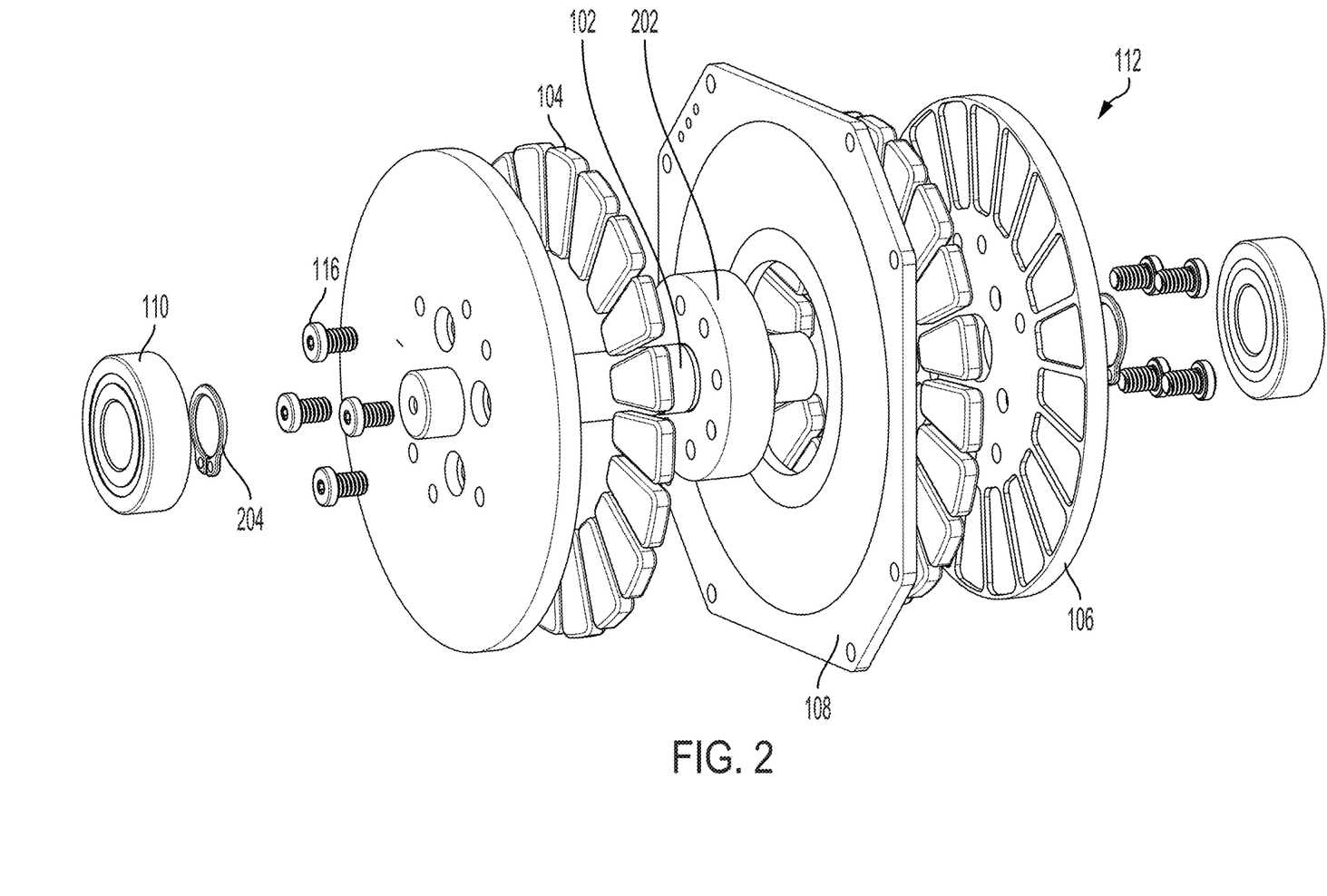
FIG. 2 shows an exploded view of the frameless motor assembly shown in FIG. 1.
Figure 3:
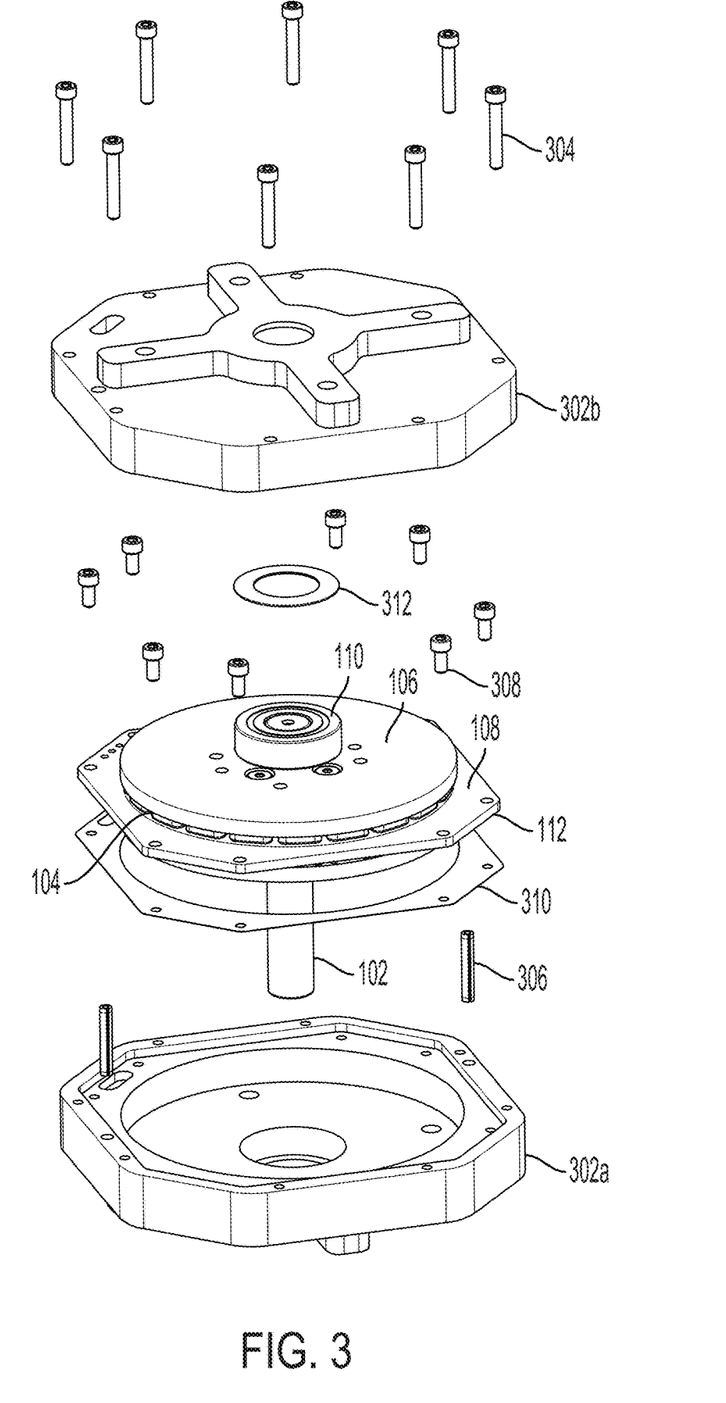
FIG. 3 shows an exploded view of a typical housing for a frameless motor assembly such as the shown in FIG. 1.

As illustrated in FIGS. 1-3, a rotor of an axial flux machine of the type described above may include a shaft 102 and two rotor plate assemblies, with each rotor plate assembly including a set of magnets 104 magnetized in the axial direction and a steel flux ring 106 (or "back iron") for a flux return path. In particular, FIG. 1 shows a perspective view of a frameless motor assembly 112, FIG. 2 shows an exploded view of the frameless motor assembly 112 shown in FIG. 1, and FIG. 3 shows how the frameless motor assembly 112 shown in FIG. 1 may be assembled within a housing 302.

As shown in FIGS. 1 and 2, the steel flux rings 106 may be secured to a hub 202 (visible only in FIG. 2) using rotor screws 116, and one or more retaining rings 204 (visible only in FIG. 2) may be used to keep components aligned axially on the shaft 102. As also illustrated, a stator 108 may sit between the rotor plate assemblies and may be secured to the housing 302 (shown in FIG. 3) which locates the stator 108 with respect to the rotor. The rotor may be secured to the housing 302 with bearings 110 that allow the rotor to spin relative to the housing 302. As can be seen in FIG. 3, the housing 302 is typically comprised of a front housing component 302a and a rear housing component 302b that are assembled together from either axial side of the motor and fastened together (e.g., using housing screws 304) at the periphery. As illustrated, housing alignment pins 306 may be used to properly align the front housing component 302a and the rear housing component 302b, and stator screws 308 may be used to secure the stator 108 to the front housing component 302a. A thermal pad 310 may be inserted between the stator 108 and the front housing component 302a to facilitate thermal conduction and/or electrical insulation between those components, and a bearing spring 312 may be positioned between one or the bearings 110 and the rear housing component 302b to provide a preload force to the bearings 110.

The present disclosure relates to a novel housing for a frameless motor assembly 112 (such as that described above) which allows assembly by inserting the frameless motor assembly 112 from a radial direction. Various features of an example housing 402 configured in accordance with the present disclosure are shown in FIGS. 4-10. As shown best in the section view shown in FIG. 5, the housing 402 may include bearing pockets 404 that are adapted to receive the bearings 110 of the frameless motor assembly 112, as well as a stator pocket 406 that is adapted to receive an edge of the stator 108 of the frameless motor assembly 112, thus allowing the frameless motor assembly 112 to slide into the housing 402 in a radial direction (as indicated by an arrow 410 shown in FIG. 4) such that the rotor can freely rotate without rotor-stator contact. This way, assembly/disassembly of the frameless motor assembly 112 and the housing 402 can happen in as little as one motion and may be ideal for various applications, such as the balancing step of machine production in which a machine is spun up such that vibration can be measured and corrected or for motors or generators that can assembled and/or disassembled in a streamlined fashion.

Rotating assemblies are typically balanced using a balance machine which supports the rotor at two locations, referred to as "plane 1" and "plane 2," and spins the rotor to a steady speed. The supports are allowed to move horizontally, perpendicular to the axis of rotation of the rotor to allow the assembly to vibrate freely. Sensors are used to measure the vibration at each plane. A sensor may also be used to measure the position and speed of the rotor which can be combined with the vibration measurements to determine the correction mass to be added or removed and the angular location for the mass addition or removal to result in a balanced rotor that results in reduced vibration.

A cylindrical radial flux motor rotor is typically balanced prior to assembly of the rotor into a center hole of the stator, which has an annular ring shape that fits around the outside of the rotor. The rotor typically includes the bearings it will use in the assembled motor which are pressed onto the shaft and have an interference fit between the bearing and the shaft to prevent the bearing from moving on the shaft. The rotor can then be balanced with the bearings resting on supporting nubs of a balance machine with the bearings used to support the rotor and allowing it to rotate during balancing. This procedure allows the rotor to be assembled into the motor and retain its balanced state.

As described above in connection with FIGS. 1-3, a frameless motor assembly 112 for an axial flux machine may be formed by placing a stator 108 between two rotor plate assemblies. If the rotor (including the shaft 102 and the two rotor plate assemblies) is balanced before it is assembled with the stator 108, one of the rotor plate assemblies must be removed and replaced to allow the stator 108 to be inserted between the two rotor plate assemblies. This removal and replacement of a rotor plate assembly can cause the frameless motor assembly 112 to become unbalanced, as there are typically clearances between parts which can allow the mass of the replaced rotor plate assembly to shift relative to the rotational axis of the rotor compared to where it was when the rotor was balanced. This change can cause the rotor to become imbalanced to a significant degree with very small displacements, as one of the rotor plate assemblies typically represents close to half of the total mass of the rotor. Such misalignment may be difficult to mitigate at low cost as very close fitting parts with tight tolerance would be required. This assembly/disassembly step is also time consuming as the magnetic force between the rotor plate assemblies must be overcome, typically using a jig which must be fixed to the rotor back iron prior to removal. It is thus desirable to balance an axial flux machine of this construction after the stator 108 has been positioned between the rotor plate assemblies to form a frameless motor assembly 112.

A housing is required for balancing to hold the stator 108 such that it does not contact the rotor as the assembly is spun up to take the imbalance measurement. Although a conventional housing, such as the housing 302 shown in FIG. 3, may be used for balancing, the use of such a housing involves a tedious assembly process. Such housings are typically assembled onto a frameless motor assembly 112 from the axial direction (e.g., as illustrated in FIG. 3) and must therefore include two halves (e.g., the front housing component 302a and rear housing component 302b shown in FIG. 3) which must be fastened together to fully constrain the rotor and stator 108. This step typically takes place with the axis of the rotor in the vertical direction while balancing takes place with the rotational axis in the horizontal direction.

Figure 4:
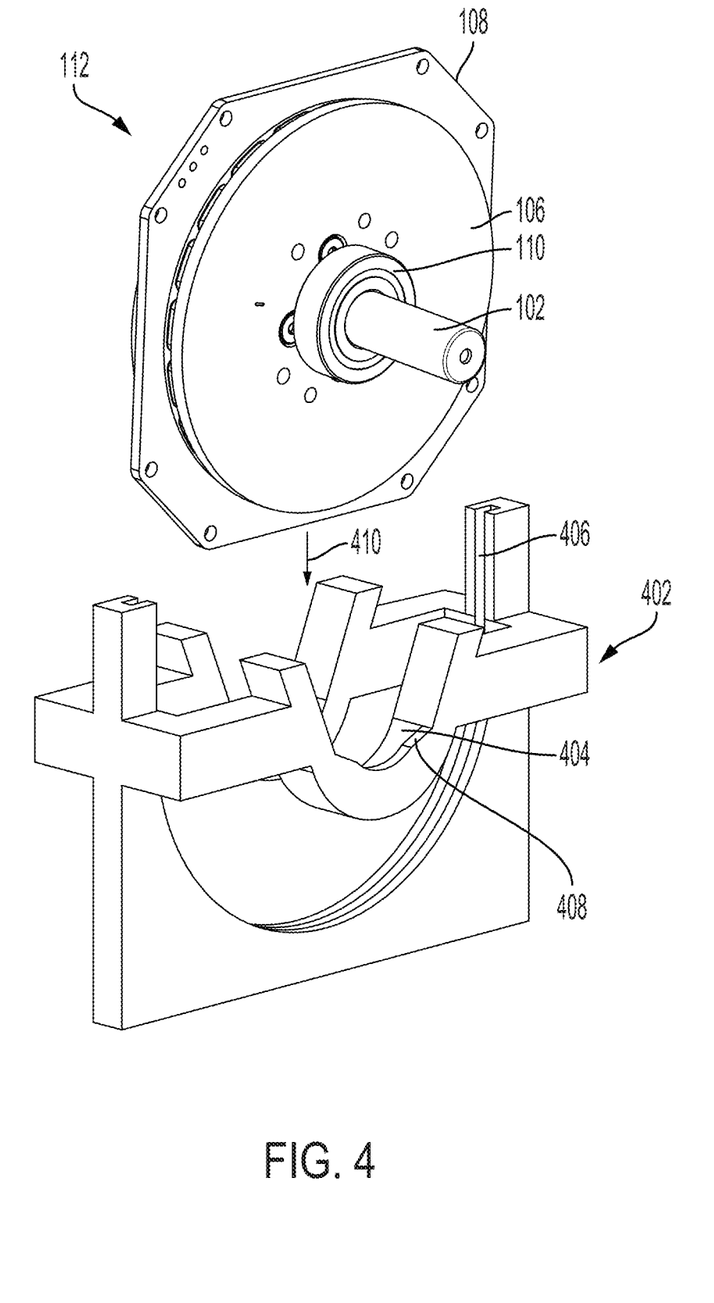
FIG. 4 shows how a frameless motor assembly may be inserted into a housing in a radial direction, in accordance with some implementations of the present disclosure.
Figure 5:
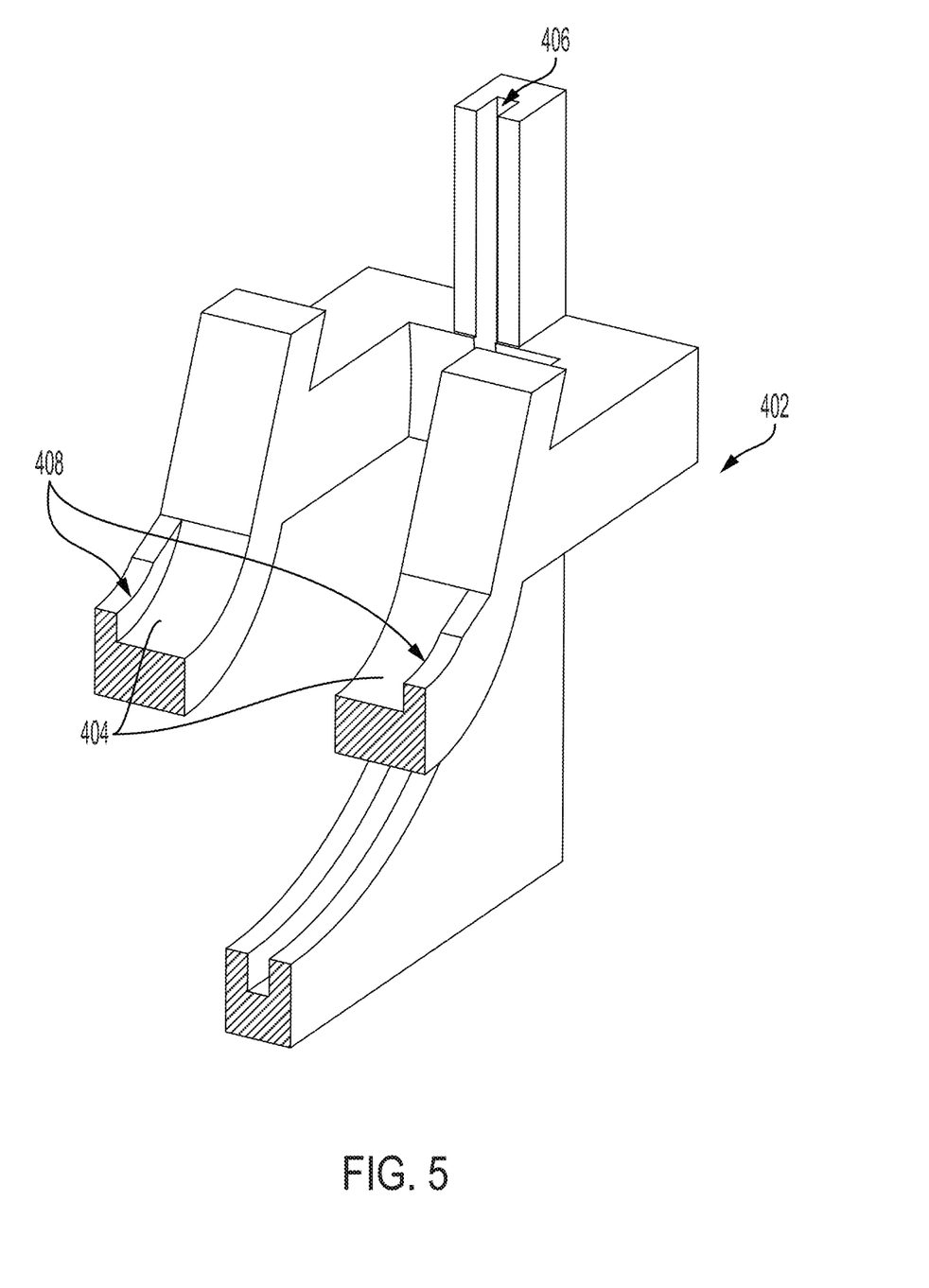
FIG. 5 shows a section view of the example housing shown in FIG. 4, in accordance with some implementations of the present disclosure.

Advantageously, the housing 402 (shown in FIGS. 4-10) allows a rotor/stator assembly (e.g., the frameless motor assembly 112) to be inserted into the housing 402 in the radial direction in a single motion, e.g., as indicated by the arrow 410 shown in FIG. 4. The housing 402 may locate the stator (e.g., the stator 108) with respect to the rotor to prevent rotor-stator contact, e.g., during an imbalance measurement or motor/generator operation. The housing 402 may include the bearing pockets 404 which are open on one side and may provide a lip 408 for each bearing 110 which may locate the rotor in the axial direction.

The stator pocket 406 may be open on one edge to allow the stator 108 to be inserted from the side and may include springs (e.g., spring tabs 702 shown in FIG. 7) which may hold the stator 108 tightly against a surface of the housing 402 within the stator pocket 406. This surface may thus locate the stator 108 axially and hold it to a plane perpendicular to the rotating axis of the rotor. The stator pocket 406 may additionally or alternatively have features on the bottom side which may stop the stator 108 at the correct depth to maintain radial alignment with the rotor. The stator pocket 406 may additionally or alternatively incorporate a non-conductive sheet 704 between the housing 402 and the stator 108 to ensure electrical isolation of the stator 108.

Figure 6:
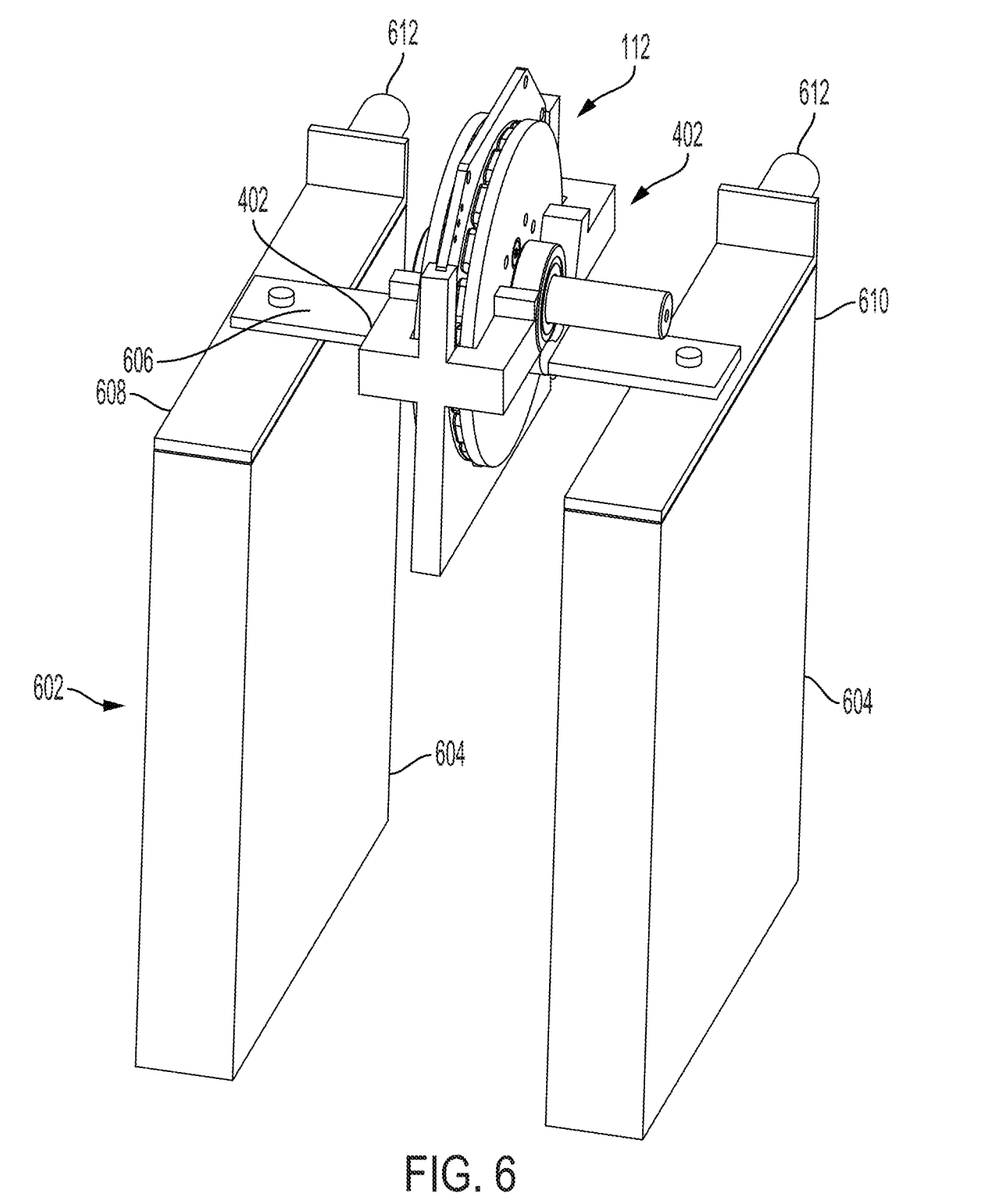
FIG. 6 illustrates how a housing such as that shown in FIG. 4 may be integrated onto a balancing machine to enable the balancing of a frameless motor assembly, in accordance with some implementations of the present disclosure.
Figure 7:
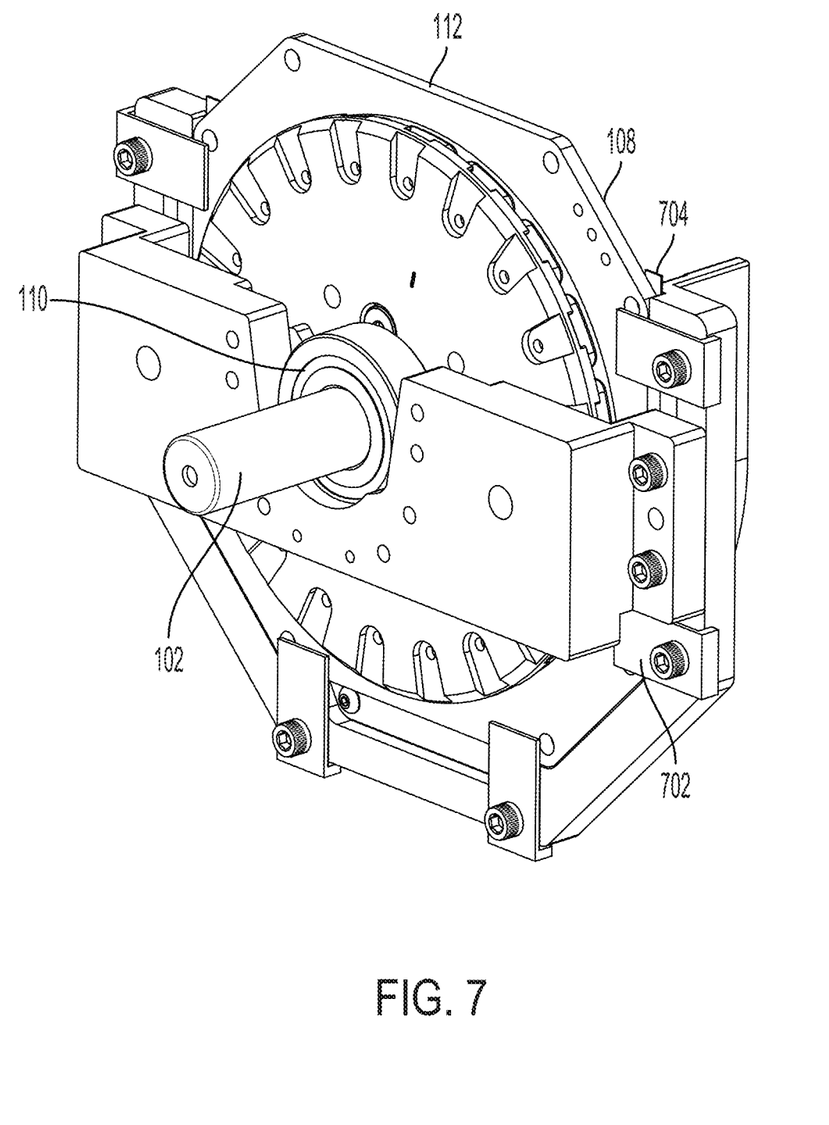
FIG. 7 illustrates example spring tabs that may be used to retain the stator of a frameless motor assembly within a housing of the type shown in FIG. 4, in accordance with some implementations of the present disclosure.

In some implementations, the housing 402 may be fixed to a rigid base 604 of a balance machine 602 (e.g., as shown in FIG. 6) such that rotor/stator assemblies may be quickly tested in large quantities for mass production. As shown in FIG. 6, for example, brackets 606 may be used to secure the housing 402 to a plane 1 support 608 and a plane 2 support 610 of the balance machine 602, with vibration sensors 612 being mounted on the respective supports 608, 610. In some implementations, for example, the plane 1 support 608 and the plane 2 support 610 may be allowed to move in the horizontal direction perpendicular to the axis of rotation of the shaft 102 of the frameless motor assembly 112, and the vibration sensors 612 may be used to measure vibration to determine the imbalance of the frameless motor assembly 112.

Another advantage of balancing the rotor after assembly with the stator 108 is that the stator 108 may be used to spin up the rotor for the balancing process, such as by connecting terminals of the stator 108 that drive windings for respective phases to a controller (not illustrated) that is configured to energize the windings with current to create a flux profile that rotates about the rotor's axis of rotation, thus causing the rotor to spin to the balancing speed. In some implementations, one or more features may be incorporated into the housing 402 to enable such a controller to be readily connected to appropriate terminals of the stator 108 when it is assembled into the balance housing 402. As one example of such a feature, a first set of terminals (which may be connected to a controller associated with the balance machine 602) may be positioned within the stator pocket 406 so that they engage with corresponding winding terminals of the stator 108 when the stator 108 is inserted into the stator pocket 406. As another example of such a feature, a set of terminals (which may be connected to a controller associated with the balance machine 602) may be provided on the housing 402 that enable one or more cables to be connected between the set of terminals and a corresponding set of winding terminals of the stator 108.

Figure 8:
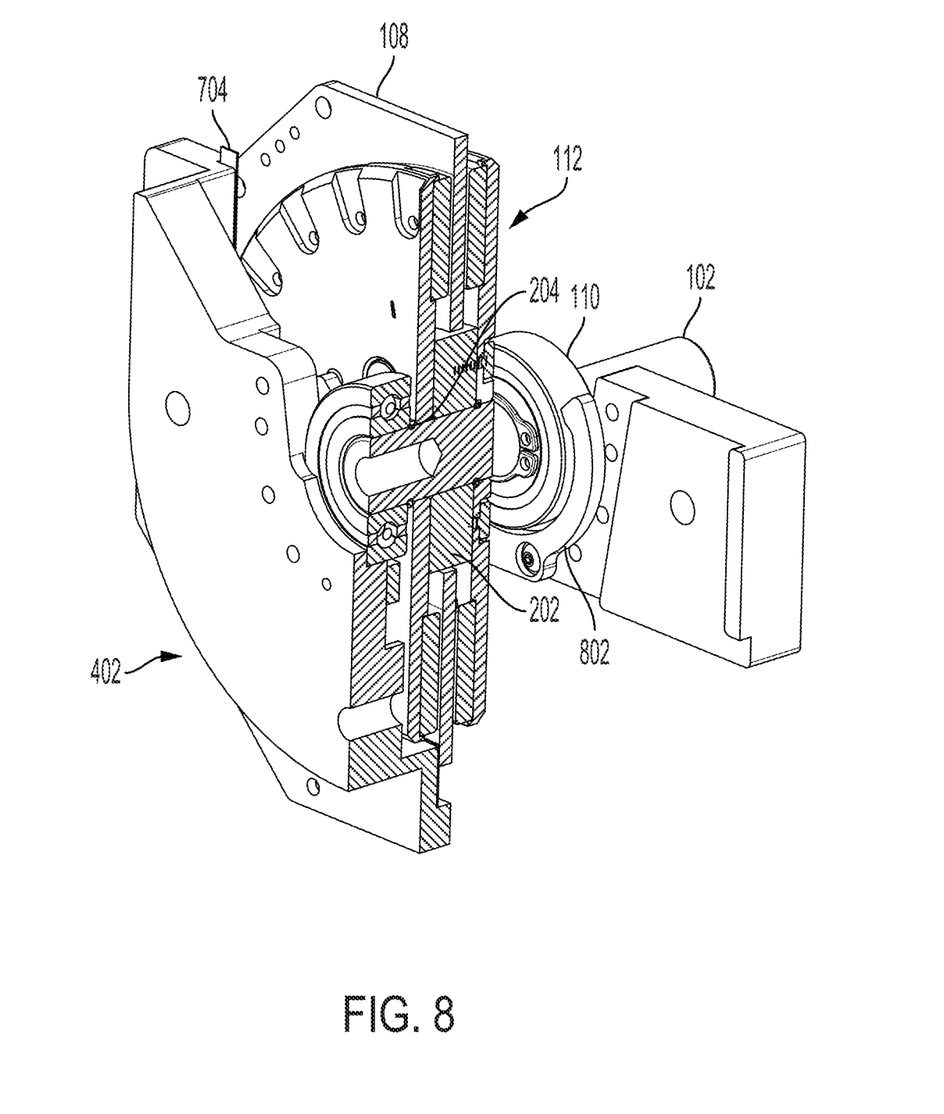
FIG. 8 illustrates example retaining springs that may be used to retain bearings of a frameless motor assembly within a housing of the type shown in FIG. 4, in accordance with some implementations of the present disclosure.

As shown in FIG. 8, in some implementations, the housing 402 may include a retention mechanism (e.g., a bearing retaining spring 802) for the bearings 110 once inserted. As illustrated, the retention mechanism (e.g., the bearing retaining spring 802) may be used to retain the bearing 110 and prevent vertical motion of the frameless motor assembly 112. One example of such a retention mechanism is a C-shaped spring clamp which allows the bearing 110 to snap into place without additional action.

Figure 9:
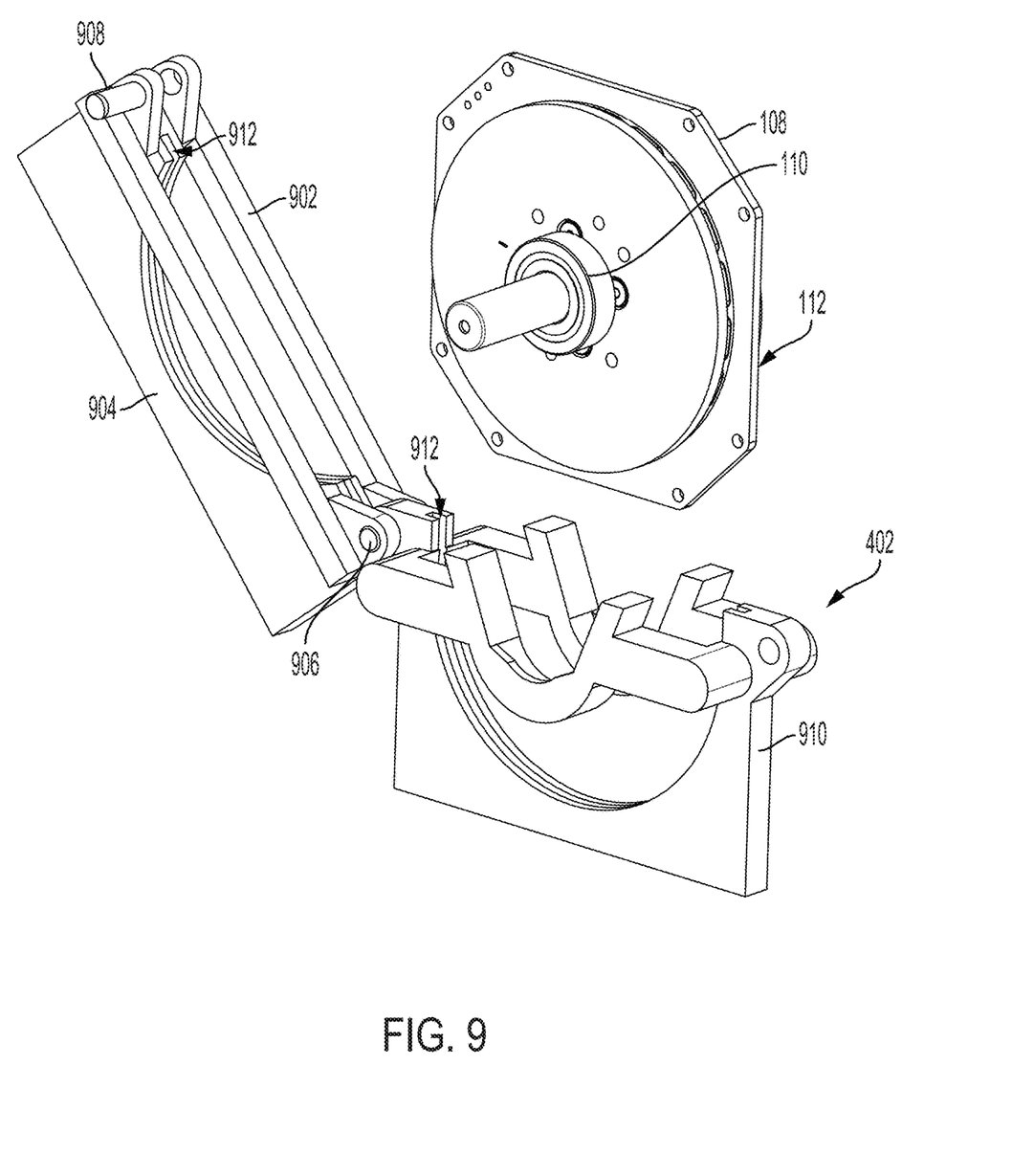
FIG. 9 shows how a housing of the type shown in FIG. 4 may include a top section that can be closed to retain the bearings and/or the stator of a frameless motor assembly within the housing, in accordance with some implementations of the present disclosure.
Figure 10:
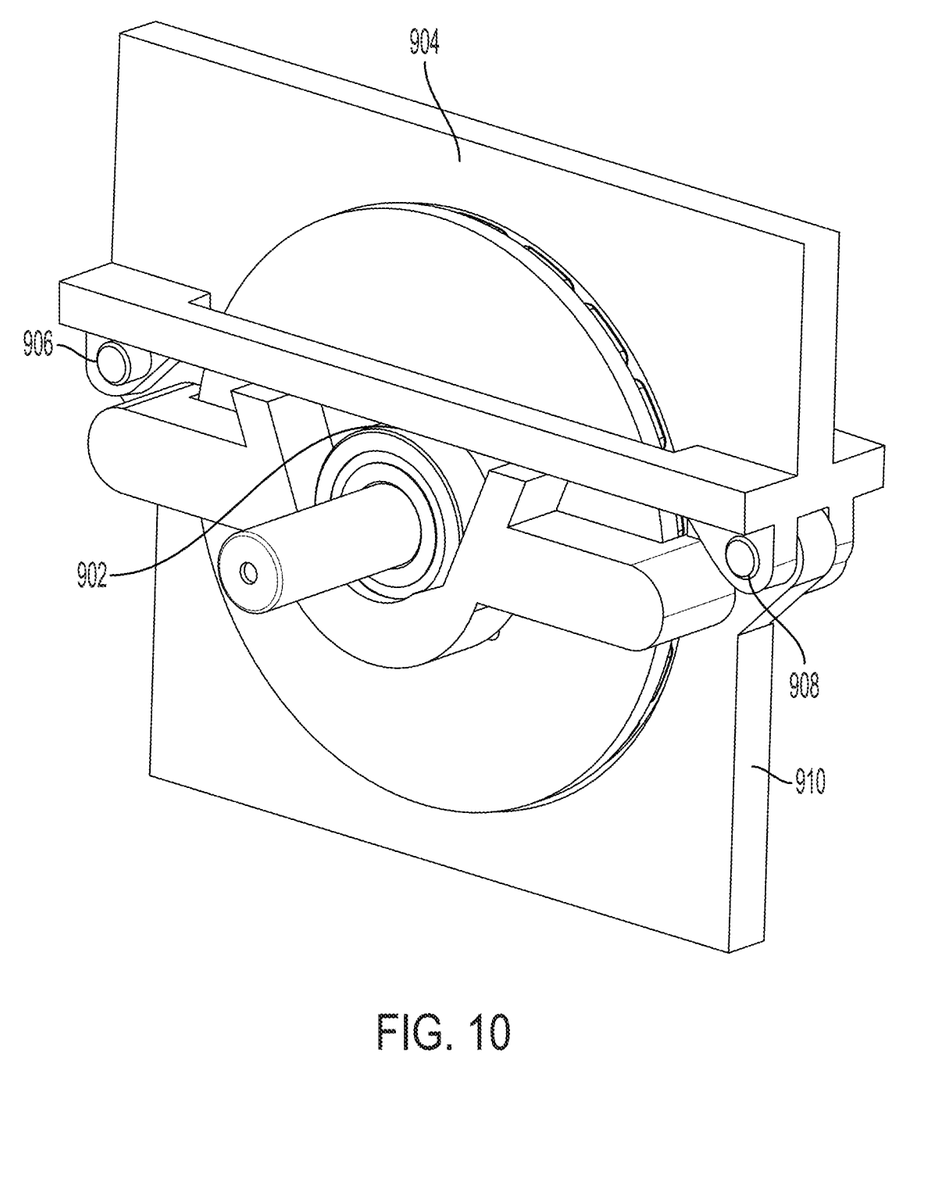
FIG. 10 shows an example housing of the type shown in FIG. 9 with the top section in a closed position, in accordance with some implementations of the present disclosure.

Further, as shown in FIGS. 9 and 10, one or more features 902 may additionally or alternatively be included to close the top of the bearing pockets 404, thus retaining the bearings 110 in place and preventing upward movement of the bearings 110 which could be caused by the same imbalance forces that the balancing process seeks to eliminate. In the illustrated example, for instance, the housing 402 may include a top section 904 that is pivotally attached to a bottom section 910 of the housing 402 (e.g., via a hinge 906) to enable the features 902 to be brought into contact with the bearings 110 after the frameless motor assembly 112 has been installed within the housing 402. As illustrated, in some implementations, the top section 904 of the housing 402 may additionally include a latch 908 configured to hold the top section 904 in a closed position after the frameless motor assembly 112 has been installed within the housing 402.

Large stators may require support along the top edge to prevent excessive warping which can cause rotor-stator contact. In some implementations, such support may be provided by the top section 904 (shown in FIGS. 9 and 10) of the housing 402, such as by including a stator pocket 912 (which may be similar to the stator pocket 406) within the top section 904 to support the top edge of the stator 108. As noted previously, the top section 904 of the housing 402 may be connected to the bottom section 910 of the housing 402 with a hinge 906 such that it can be easily closed onto the stator 108 after the frameless motor assembly 112 has been inserted into the bottom section 910 of the housing 402. As also noted previously, the top section 904 may also include features 902 that contact the bearings 110 and prevent their movement in the vertical direction such that only a single additional action is required to constrain both the stator 108 and the bearings 110 after the frameless motor assembly 112 has been inserted.

In some implementations, sensors may also be incorporated into the housing 402 to measure the position of the rotor. For example, one or more Hall effect sensors may be used to detect the position of the magnets by measuring their magnetic field. One or more optical encoders may additionally or alternatively be used to detect features on the rotor to determine its position. Many rotors for servo motors will have such features included in a disc which is used to measure the rotor position in the final motor assembly. Vibration sensors may additionally or alternatively be mounted directly on the housing 402.

The following clauses describe example inventive aspects of the novel housing configurations and balancing techniques disclosed herein.

Clause 1. An apparatus, comprising: a housing for an assembly of an axial flux machine, the assembly including at least a stator, a rotor, and bearings attached to the rotor, the housing being configured to support and locate the bearings and the stator within pockets that are open on one side to allow the assembly to be inserted into the housing in a direction perpendicular to a rotational axis of the rotor.

Clause 2. The apparatus of clause 1, further comprising: spring tabs that are configured and arranged to hold the stator against a face of the housing.

Clause 3. The apparatus of clause 1 or claim 2, further comprising: a retention mechanism configured and arranged to hold the bearings in place within the pockets after the assembly has been inserted into the housing.

Clause 4. The apparatus of clause 3, wherein the retention mechanism includes C shaped springs adapted to engage upper portions of the bearings.

Clause 5. The apparatus of clause 3, wherein the retention mechanism is included in an upper portion of the housing that is movable relative to a lower portion of the housing that includes the pockets.

Clause 6. The apparatus of clause 5, wherein the upper portion of the housing is pivotally attached to the lower portion of the housing.

Clause 7. The apparatus of clause 5 or claim 6, wherein the upper portion of the housing is further configured to support an upper portion of the stator.

Clause 8. The apparatus of any of clauses 1-3, further comprising: an upper portion of the housing that is movable relative to a lower portion of the housing that includes the pockets, the upper portion of the housing being configured to selectively engage at least one of the bearings or an upper portion of the stator after the assembly has been inserted into the housing.

Clause 9. The apparatus of clause 8, wherein the upper portion of the housing is pivotally attached to the lower portion of the housing.

Clause 10. The apparatus of clause 8 or claim 9, wherein the upper portion of the housing is configured to support the upper portion of the stator.

Clause 11. The apparatus of any of clause 1-10, wherein the housing is attached to a balance machine that is configured to balance the assembly.

Clause 12. The apparatus of any of clauses 1-11, wherein the housing includes one or more features to enable electrical contact between winding leads of the stator and leads of a controller that is configured to energize the winding leads with current.

Clause 13. The apparatus of clause 12, wherein the one or more features are configured to establish the electrical contact between the winding leads of the stator and the leads of the controller as a result of the assembly being inserted into the housing.

Clause 14. The apparatus of clause 12, wherein the one or more features comprise terminals that are connected to the leads of the controller, to enable the electrical contact between the winding leads of the stator and the leads of the controller via one or more cables connected to the terminals.

Clause 15. The apparatus of any of clauses 1-14, further comprising a controller configured to energize one or more windings of the stator, while the assembly is positioned in the housing, to cause the rotor to rotate for balancing the assembly.

Clause 16. The apparatus of any of clauses 1-15, further comprising: at least one vibration sensors mounted to the housing.

Clause 17. The apparatus of any of clauses 1-16, further comprising: at least one hall effect sensor configured and arranged to detect a position of the rotor.

Clause 18. The apparatus of any of clauses 1-17, further comprising: an optical sensor configured and arranged to detect features on the rotor.

Clause 19. A method, comprising: inserting an assembly of an axial flux machine into a housing, wherein the assembly includes at least a rotor, bearings attached to the rotor, and a stator, and the assembly is inserted into the housing in a direction perpendicular to a rotational axis of the rotor; and rotating the rotor relative to the housing.

Clause 20. The method of clause 19, wherein the housing includes pockets configured and arranged to support and locate the bearings and the stator.

Clause 21. The method of clause 19 or claim 20: using spring tabs to hold the stator against a face of the housing.

Clause 22. The method of any of clauses 19-21, further comprising: using a retention mechanism to hold the bearings in place within the housing after the assembly has been inserted into the housing.

Clause 23. The method of clause 22, wherein the retention mechanism includes C shaped springs adapted to engage upper portions of the bearings.

Clause 24. The method of clause 22, wherein the retention mechanism is included in an upper portion of the housing that is movable relative to a lower portion of the housing, and the method further comprises: moving the upper portion of the housing toward the lower portion of the housing to cause the retention mechanism to engage the bearings.

Clause 25. The method of clause 24, wherein the upper portion of the housing is pivotally attached to the lower portion of the housing.

Clause 26. The method of clause 24 or claim 25, wherein the upper portion of the housing is further configured to support an upper portion of the stator, and the method further comprises: moving the upper portion of the housing toward the lower portion of the housing to cause the upper portion of the housing to engage the upper portion of the stator.

Clause 27. The method of any of clauses 19-22, wherein an upper portion of the housing is movable relative to a lower portion of the housing, and the method further comprises: after the assembly has been inserted into the lower portion of the housing, moving the upper portion of the housing relative to the lower portion of the housing to cause the upper portion of the housing to engage at least one of the bearings or an upper portion of the stator.

Clause 28. The method of clause 27, wherein the upper portion of the housing is pivotally attached to the lower portion of the housing.

Clause 29. The method of clause 27 or claim 28, wherein the upper portion of the housing is configured to support the upper portion of the stator.

Clause 30. The method of any of clause 19-29, further comprising: operating a balancing machine attached to the housing to balance the assembly.

Clause 31. The method of any of clauses 19-30, wherein the housing includes one or more features to enable electrical contact between winding leads of the stator and leads of a controller that is configured to energize the winding leads with current.

Clause 32. The method of clause 31, wherein the one or more features are configured to establish the electrical contact between the winding leads of the stator and the leads of the controller as a result of the assembly being inserted into the housing.

Clause 33. The method of clause 32, wherein the one or more features comprise terminals that are connected to the leads of the controller, to enable the electrical contact between the winding leads of the stator and the leads of the controller via one or more cables connected to the terminals.

Clause 34. The method of any of clauses 19-33, further comprising: using a controller to energize one or more windings of the stator, while the assembly is positioned in the housing, to cause the rotor to rotate for balancing the assembly.

Clause 35. The method of any of clauses 19-34, further comprising: using at least one sensor mounted to the housing to monitor vibration of the assembly as the rotor rotates during a balancing operation.

Clause 36. The method of any of clauses 19-35, further comprising: using at least one hall effect sensor to detect a position of the rotor as the rotor rotates during a balancing operation.

Clause 37. The method of any of clauses 19-36, further comprising: using an optical sensor to detect features on the rotor as the rotor rotates during a balancing operation.

Clause 38. The method of any of clauses 19-37, wherein the stator has a generally planar configuration.

Clause 39. The method of clause 38, wherein the stator includes a printed circuit board having conductive traces defining windings for poles of the stator.

Clause 40. The apparatus of any of clauses 1-18, wherein the stator has a generally planar configuration.

Clause 41. The apparatus of clause 40, wherein the stator includes a printed circuit board having conductive traces defining windings for poles of the stator.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. An apparatus for supporting an assembly of an axial flux machine, the assembly including at least a stator, a rotor, and bearings attached to the rotor, the apparatus comprising:
   a housing configured to support and locate the bearings and the stator, wherein the housing includes one or more pockets that are open on one side to allow the assembly to be inserted into the one or more pockets in a direction perpendicular to a rotational axis of the rotor so that the one or more pockets support and locate the bearings and the stator.

2. The apparatus of claim 1, wherein the stator has a substantially planar configuration.

3. The apparatus of claim 2, wherein the stator includes a printed circuit board having conductive traces defining windings for poles of the stator.

4. The apparatus of claim 1, further comprising:
   spring tabs that are configured and arranged to hold the stator against a face of the housing.

5. The apparatus of claim 1, further comprising:
a retention mechanism configured and arranged to hold the bearings in place within the one or more pockets after the assembly has been inserted into the housing.

6. The apparatus of claim 5, wherein the retention mechanism is included in an upper portion of the housing that is movable relative to a lower portion of the housing that includes the one or more pockets.

7. The apparatus of claim 1, further comprising:
an upper portion of the housing that is movable relative to a lower portion of the housing that includes the one or more pockets, the upper portion of the housing being configured to selectively engage at least one of the bearings or an upper portion of the stator after the assembly has been inserted into the housing.

8. The apparatus of claim 7, wherein the upper portion of the housing is pivotally attached to the lower portion of the housing.

9. The apparatus of claim 7, wherein the upper portion of the housing is configured to support the upper portion of the stator.

10. The apparatus of claim 1, wherein the housing is attached to a balance machine that is configured to balance the assembly.

11. The apparatus of claim 1, wherein:
the housing includes one or more features to enable electrical contact between winding leads of the stator and leads of a controller that is configured to energize the winding leads with current; and
the one or more features are configured to establish the electrical contact between the winding leads of the stator and the leads of the controller as a result of the assembly being inserted into the housing.

12. The apparatus of claim 1, further comprising a controller configured to energize one or more windings of the stator, while the assembly is positioned in the housing, to cause the rotor to rotate for balancing the assembly.

13. A method, comprising:
inserting an assembly of an axial flux machine into a housing including one or more pockets, wherein the assembly includes at least a rotor, bearings attached to the rotor, and a stator, and the assembly is inserted into the one or more pockets in a direction perpendicular to a rotational axis of the rotor so that the one or more pockets support and locate the bearings and the stator; and
rotating the rotor relative to the housing.

14. The method of claim 13, wherein the stator has a substantially planar configuration.

15. The method of claim 14, wherein the stator includes a printed circuit board having conductive traces defining windings for poles of the stator.

16. The method of claim 13, further comprising: using a retention mechanism to hold the bearings in place within the one or more pockets after the assembly has been inserted into the housing.

17. The method of claim 16, wherein the retention mechanism is included in an upper portion of the housing that is movable relative to a lower portion of the housing that includes the one or more pockets, and the method further comprises:
moving the upper portion of the housing toward the lower portion of the housing to cause the retention mechanism to engage the bearings.

18. The method of claim 13, wherein an upper portion of the housing is movable relative to a lower portion of the housing, and the method further comprises:
after the assembly has been inserted into the lower portion of the housing, moving the upper portion of the housing relative to the lower portion of the housing to cause the upper portion of the housing to engage at least one of the bearings or an upper portion of the stator.

19. The method of claim 18, wherein the upper portion of the housing is pivotally attached to the lower portion of the housing.

20. The method of claim 13, further comprising:
operating a balancing machine attached to the housing to balance the assembly.

21. The method of claim 13, wherein:
the housing includes one or more features to enable electrical contact between winding leads of the stator and leads of a controller that is configured to energize the winding leads with current; and
the one or more features are configured to establish the electrical contact between the winding leads of the stator and the leads of the controller as a result of the assembly being inserted into the housing.

22. The method of claim 13, further comprising:
using a controller to energize one or more windings of the stator, while the assembly is positioned in the housing, to cause the rotor to rotate for balancing the assembly.

23. The method of claim 13, further comprising:
using at least one sensor mounted to the housing to monitor vibration of the assembly as the rotor rotates during a balancing operation.

24. The method of claim 13, wherein: the one or more pockets include bearing pockets and a stator pocket; and the assembly is inserted into the housing so that (i) the bearing pockets support and locate the bearings and (ii) the stator pocket supports and locates the stator.

25. The apparatus of claim 1, wherein the one or more pockets include:
bearing pockets configured to support and locate the bearings; and
a stator pocket configured to support and locate the stator.

* * * * *